(12) United States Patent
Dayar et al.

(10) Patent No.: US 7,469,138 B2
(45) Date of Patent: Dec. 23, 2008

(54) METHOD AND SYSTEM FOR PROVIDING LOCATION INFORMATION FOR MOBILE INTERNET CALLING DEVICES

(75) Inventors: Zeynep Dayar, Cary, NC (US); Aaron E. Merkin, Holly Springs, NC (US); David B. Rhoades, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/566,572

(22) Filed: Dec. 4, 2006

(65) Prior Publication Data
US 2008/0132198 A1    Jun. 5, 2008

(51) Int. Cl.
*H04M 11/04* (2006.01)

(52) U.S. Cl. .............. 455/404.2; 455/456.1; 455/456.2; 455/456.3; 379/45

(58) Field of Classification Search ........... 455/404, 455/456, 404.2; 342/357.1; 379/221.01, 379/45
See application file for complete search history.

(56) References Cited

U.S. PATENT DOCUMENTS

| | | | |
|---|---|---|---|
| 5,347,568 A | 9/1994 | Moody et al. | |
| 6,289,083 B1 | 9/2001 | Ray | |
| 6,678,357 B2 | 1/2004 | Stumer et al. | |
| 6,868,139 B2 | 3/2005 | Stumer et al. | |
| 6,968,044 B2 | 11/2005 | Beason et al. | |
| 2003/0109245 A1* | 6/2003 | McCalmont et al. | 455/404 |
| 2005/0047574 A1 | 3/2005 | Reid | |
| 2005/0063519 A1 | 3/2005 | James | |
| 2005/0175166 A1* | 8/2005 | Welenson et al. | 379/265.02 |
| 2005/0243973 A1 | 11/2005 | Laliberte | |
| 2007/0026842 A1* | 2/2007 | Haave et al. | 455/404.2 |
| 2007/0200754 A1* | 8/2007 | Fuchs et al. | 342/357.1 |

* cited by examiner

*Primary Examiner*—Curtis Kuntz
*Assistant Examiner*—Phung-Hoang J Nguyen
(74) *Attorney, Agent, or Firm*—Sawyer Law Group LLP

(57) ABSTRACT

A method and system for providing location information for a mobile Internet calling device are described. The method and system include receiving client information from the mobile Internet calling device coupled with a network at a location and providing the mobile Internet calling device with the location information corresponding to the location. The method and system further include providing the location information to a calling service provider in response to an emergency call made by the mobile Internet calling device when coupled with the network.

3 Claims, 3 Drawing Sheets

METHOD AND SYSTEM FOR PROVIDING LOCATION INFORMATION FOR MOBILE INTERNET CALLING DEVICES

FIELD OF THE INVENTION

The method and system relate to mobile Internet calling devices, and more particularly to providing location information, particularly for selection of public safety access points, for mobile Internet calling devices.

BACKGROUND

Internet calling devices, particularly voice over Internet protocol (VoIP) devices, have increased in popularity. Such Internet calling devices may include a VoIP adapter that is connected to a conventional phone, a VoIP telephone that has the functions of the VoIP adapter and a conventional telephone incorporated into a single device, a laptop having voice capabilities, and other devices. Furthermore, mobile Internet calling devices, such as a mobile VoIP device, are portable. In operation, the Internet calling device is connected to a network from some location having Internet connectivity. A call from the Internet calling device is routed through the network, over the Internet, and to existing telephone networks. Thus, a mobile Internet calling device can be used to make telephone calls from virtually any location having Internet connectivity using VoIP or analogous technology.

Although calls can be made through mobile Internet calling devices, because they do not correspond to a fixed location, additional issues may be encountered when attempting to access emergency services through the mobile Internet calling devices. For conventional land lines, a conventional 911 infrastructure is used in routing emergency calls. The conventional 911 infrastructure utilizes a static database that associates telephone numbers for land lines with physical locations. Using this database, the conventional 911 infrastructure routes an emergency call from a land line number to a public safety access point (PSAP) corresponding to the location of the land line initiating the call. The PSAP then connects the emergency call to the appropriate emergency services. In contrast, a mobile Internet calling device is not associated with a fixed location. Consequently, the conventional 911 infrastructure may be unable to route an emergency call from a mobile Internet calling device to the appropriate PSAP. As a result, emergency services may be difficult to access through the mobile Internet calling device.

Some conventional methods have been proposed to aid in routing emergency calls from mobile Internet calling devices using VoIP. Such conventional methods may add hardware devices in networks to which the mobile Internet calling device is connected. These hardware devices associate information such as physical location and/or the corresponding PSAP with the network port over which VoIP traffic for the mobile Internet calling device occurs. Other conventional methods extend technology used in cellular telephones. For cellular telephones, GPS devices incorporated into the cellular phone and/or the cellular tower accessed by the cellular phone can be used to associate the cellular phone with a location. These locations can then be associated with the corresponding PSAP. Other conventional methods require on a static mapping of mobile Internet calling devices to locations which may be used in addition to databases used by the existing 911 infrastructure.

Although these methods may function, there are significant drawbacks. Use of databases that map mobile Internet calling devices to locations may require that the database of the 911 infrastructure be changed, which is undesirable. Conventional VoIP technology for routing emergency calls requires the addition of dedicated hardware, which is undesirable. In addition, this conventional method may require additional information to be shared between the owner of the network to which the mobile Internet calling device is connected and the emergency services infrastructure that routes an emergency call to a PSAP. Consequently, the network and the entity used to relay information to the PSAP would preferably be owned by the same entity. This restriction may be undesirable. Cellular technology relying locations of cell towers would share a similar drawback. Other cellular technology may require the use of GPS devices in mobile Internet calling devices. Typically, mobile Internet calling devices do not include such a device. Thus, associating a mobile Internet calling device with a location, and thus routing calls to the appropriate PSAP may be problematic.

Accordingly, what is needed is a method and system for improving access of mobile Internet calling devices to emergency services. The present invention addresses such a need.

BRIEF SUMMARY

A method and system for providing location information for a mobile Internet calling device are described. The method and system include receiving client information from the mobile Internet calling device coupled with a network at a location and providing the mobile Internet calling device with the location information corresponding to the location. The method and system further include providing the location information to a calling service provider in response to an emergency call made by the mobile Internet calling device when coupled with the network.

According to the method and system disclosed herein, location information can be associated with a mobile Internet calling device. Consequently, emergency calls from the mobile Internet calling device may be routed to emergency services corresponding to the location of the mobile Internet calling device.

DETAILED DESCRIPTION

Figure 1:
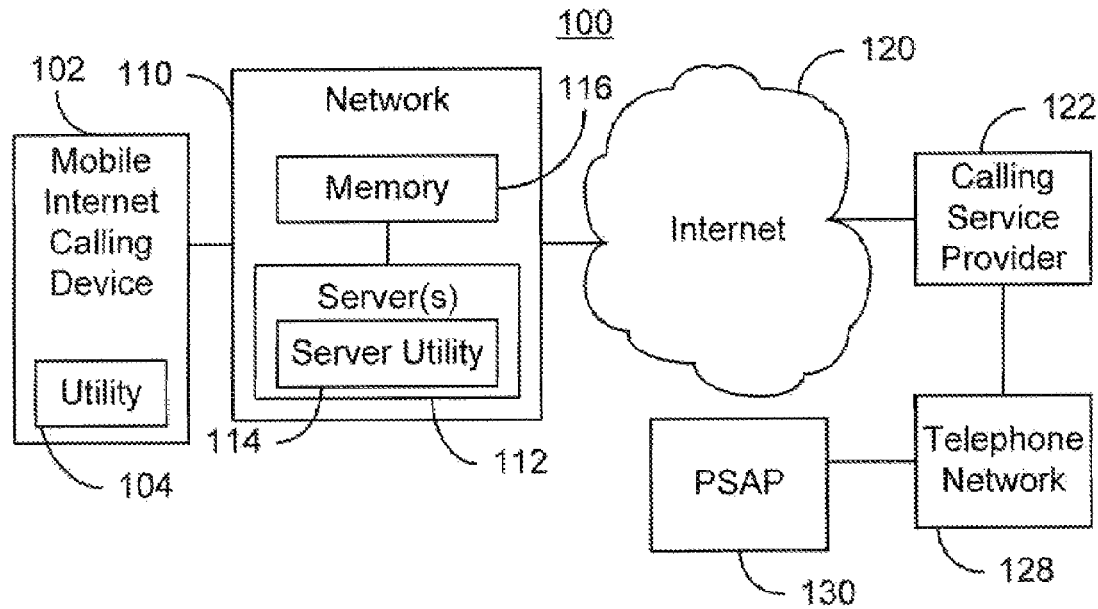
FIG. 1 depicts an exemplary embodiment of a system for routing emergency calls from mobile Internet calling devices.

The method and system relate to mobile Internet calling devices. The following description is presented to enable one of ordinary skill in the art to make and use the method and system and is provided in the context of a patent application and its requirements. Various modifications to the embodiments and the generic principles and features described herein will be readily apparent to those skilled in the art. Thus, the method and system are not limited to the embodiments shown, but is to be accorded the widest scope consistent with the principles and features described herein.

A method and system for providing location information for a mobile Internet calling device are described. The method and system include receiving client information form the mobile Internet calling device coupled with a network at a location and providing the mobile Internet calling device with the location information corresponding to the location. The method and system further include providing the location information to a calling service provided in response to an emergency call made by the mobile Internet calling device when coupled with the network.

The method and system will be described in terms of particular mobile Internet calling devices and protocols, such as VoIP and dynamic host configuration protocol (DHCP). However, one of ordinary skill in the art will recognize that other mobile Internet calling devices and protocols may be used. In addition, for simplicity, the method and system are described in the context of a single mobile Internet calling device connected to a single network and utilizing a single calling service provider. However, one of ordinary skill in the art will readily recognize that the method and system may be used for multiple Internet calling devices, multiple networks, and multiple calling service providers.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To move particularly describe the present invention, refer to FIG. 1, depicting an exemplary embodiment of a system 100 for routing emergency calls from a mobile Internet calling device 102. The system 100 also includes a network 110 having server(s) 112 and memory 116 and that is coupled with the Internet 120, calling services provider 122, telephone network 128, and PSAP 130. For simplicity, other calling devices, networks, and other components are not shown. The mobile Internet calling device 102 includes a utility 104 for use in routing emergency calls and/or obtaining location information. The utility 104 is preferably implemented in software. Although depicted as a separate utility 104, the utility 104 may be incorporated in whole or in part in existing applications (not shown). In addition, although depicted as separate entities, the memory 116 may be incorporated into the server(s) 112. The mobile Internet calling device 102 is connected to the Internet 120 through the network 110.

The network 110 includes server(s) 112 for performing various functions. One or more of the server(s) 112 includes a server utility 114 for providing location information and/or routing emergency calls from the mobile Internet calling device 102. The server utility 114 is preferably implemented in software and in a DHCP server that is one of the server(s) 112 in the network 110. Although depicted as a separate server utility 114, the server utility 114 may be incorporated in whole or in part in existing applications (not shown). The calling service provider 122 is responsible for passing calling information from the mobile Internet calling device 102 through the Internet 120, as well as to a conventional telephone network 128. The PSAP 130 routes emergency services (not shown) in response to receiving an emergency call. The PSAP 130 receives calls through and is coupled to the conventional telephone network 128.

Figure 2:
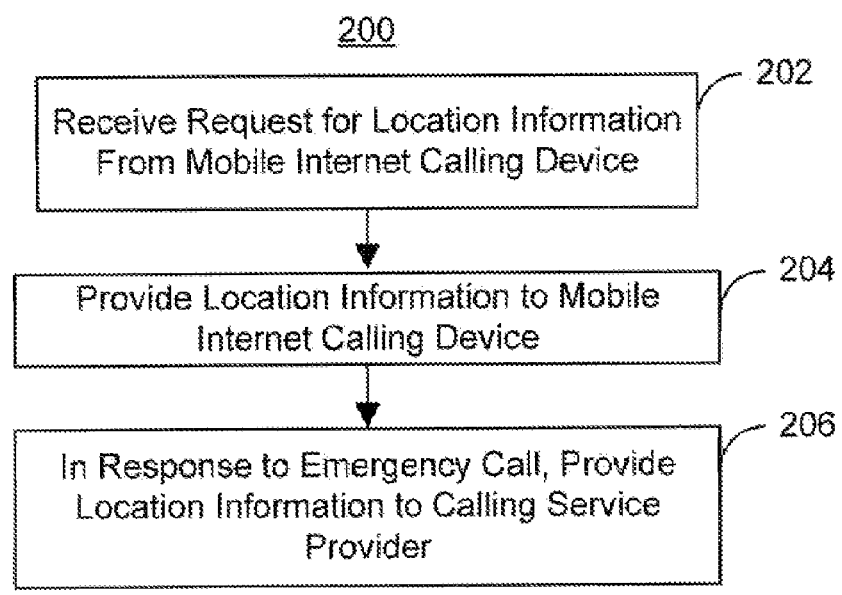
FIG. 2 depicts an exemplary embodiment of a method for associating mobile Internet calling devices with locations.

FIG. 2 depicts an exemplary embodiment of a method 200 for associating mobile Internet calling devices with locations. For clarity, the method 200 is described in the context of the system 100. However, one of ordinary skill in the art will readily recognize that the method 200 may be utilized with another system having different and/or additional components. The method 200 is preferably performed using the server(s) 112.

The server(s) 112 receive client information from the mobile Internet calling device 102 that is coupled with the network 110, via step 202. The client information includes a request for location information. In a preferred embodiment, this takes the form of a DHCP request for use of an option provided by the server utility 114. This request is preferably associated with a request for an IP configuration for the mobile Internet calling device 102. The server utility 114 may be an option, preferably a DHCP option, which allows for location information to be provided to a mobile Internet calling devices 102. The location information is provided to the mobile Internet calling device 102, via step 204. The location information provided in step 204 is determined by the authorized user(s) of the network 110, for example administrator(s) and provided to the server utility 114 and stored on the memory 116 associated with the server utility 114. The location information identifies a physical location that corresponds to the mobile Internet calling device when coupled to the network 210. The location information corresponds to the portion of the network 110 to which the mobile Internet calling device 102 is connected. Thus, the location information may include a fixed line telephone number of the location at which the server(s) 112 reside, the fixed line telephone number(s) of the location(s) serviced by the server(s) 112, the fixed line number corresponding to the mobile Internet calling device 102 when connected to the network 110 at a particular physical location, the PSAP identifier(s) for the PSAP 130 that services the location corresponding to one of the fixed line telephone numbers described above, and/or other information indicating the physical location at which the mobile Internet calling device 102 is connected to the network 110. A single set of location information might be provided for all mobile Internet calling devices connected to the network 110. Alternatively, multiple sets of location information may be provided corresponding to multiple locations at which mobile Internet calling devices may be connected. Thus, the mobile Internet calling device 102 is provided with information indicating the physical location at which it currently resides. In response to an emergency call made by the mobile Internet calling device 102 while still coupled to the network 110 at the same location, this location information is provided to the calling service provider 122, via step 206. In a preferred embodiment, the network 110 transfers this information to the Internet 120 and the calling service provider 122 as part of the emergency call. Thus, the calling service provider 122 may route the emergency call to the appropriate PSAP 130 through the telephone network 128.

Thus, the method 200 provides the mobile Internet calling device 102 with information indicating the physical location at which the mobile Internet calling device 102 currently resides. In response to an emergency call made by the mobile Internet calling device 102 while still coupled to the network 110 at the same location, this location information may be provided to the calling service provider 122. In a preferred embodiment, the network 110 transfers this information to the Internet 120 and the calling service provider 122 as part of the emergency call. Thus, the calling service provider 122 may route the emergency call to the appropriate PSAP 130. This functionality is provided without requiring additional hardware within the network 110 or mobile Internet calling device 102. Particularly for embodiments using fixed line telephone numbers and/or PSAP identifiers, location information transferred to the calling service provider 122 is sufficient that the calling service provider 122 need not own the infrastructure to route an emergency call to the appropriate PSAP 130. Further, for embodiment using fixed line telephone numbers, changes to the database used by the PSAP may also be rendered superfluous.

Figure 3:
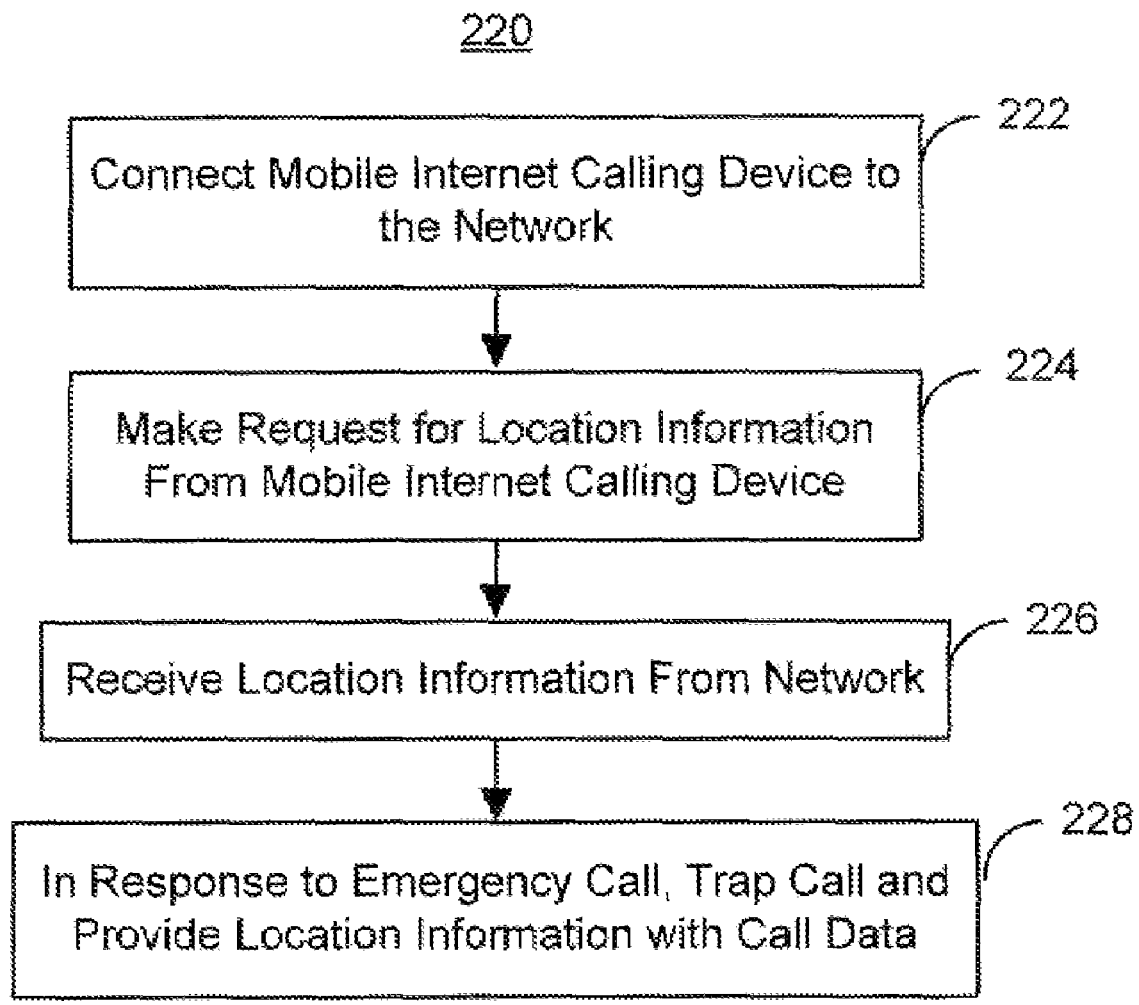
FIG. 3 depicts another exemplary embodiment of a method for associating mobile Internet calling devices with locations.

FIG. 3 depicts another exemplary embodiment of a method 220 for associating mobile Internet calling devices with locations. For clarity, the method 220 is described in the context of the system 100. However, one of ordinary skill in the art will readily recognize that the method 220 may be utilized with another system having different and/or additional components. The method 220 is performed using the mobile Internet calling device 102.

The mobile Internet calling device 102 is connected to the network 110, via step 222. The mobile Internet calling device 102 then requests the location information from the server(s) 112, via step 224. Typically, this takes the form of a DHCP request for use of the option provided by the server utility in conjunction with a request for an IP configuration. The location information is received by the mobile Internet calling device 102 from the server(s) 112, via step 226. If a user of the mobile Internet calling device 102 initiates a call for emergency services, the mobile Internet calling device traps the call and inserts the location information, via step 228. Preferably, step 228 includes inserting the fixed line telephone number(s) of the location corresponding to the mobile Internet calling device 102 as an origination identifier for the emergency call and PSAP identifier(s) for the PSAP 130. Consequently, the location information may be relayed to the calling service provider 122, which may then relay the emergency call to the appropriate PSAP 130 via the telephone network 128. Thus, the mobile Internet calling device 102 is may obtain information indicating the physical location at which it currently resides and provide this information along with an emergency call. Routing of the emergency call to the appropriate PSAP 130 if facilitated. This functionality is provided without requiring additional hardware within the network 110 or mobile Internet calling device 102. In addition, routing the emergency call to the appropriate PSAP 130 may be achieved without requiring that the calling service provider 122 own the infrastructure, such as the network 122. Further, changes to the database used by the PSAP 130 may also be avoided.

Figure 4:
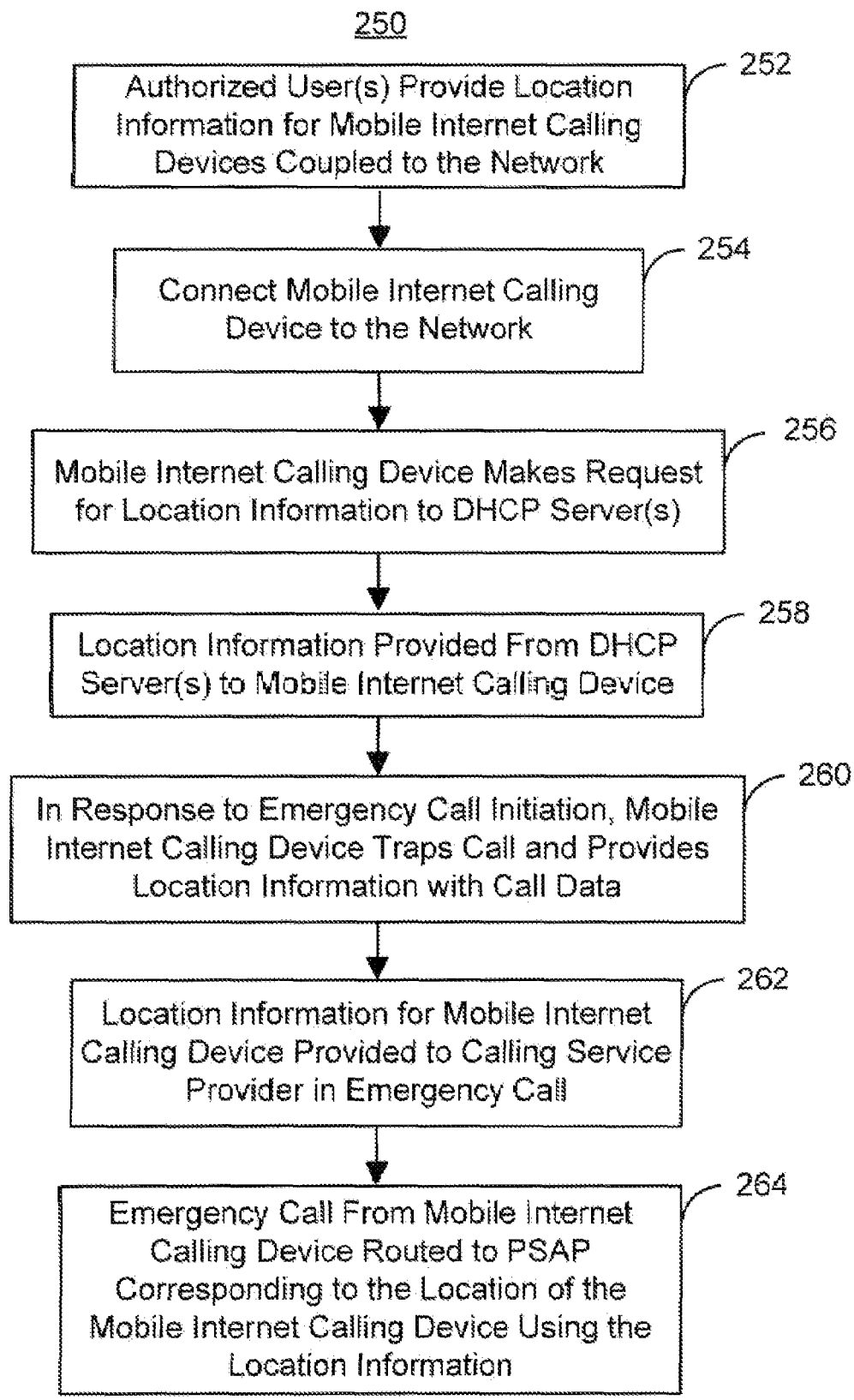
FIG. 4 depicts another exemplary embodiment of a method for associating mobile Internet calling devices with locations.

FIG. 4 depicts another exemplary embodiment of a method 250 for associating mobile Internet calling devices with locations. For clarity, the method 250 is described in the context of the system 100. However, one of ordinary skill in the art will readily recognize that the method 250 may be utilized with another system having different and/or additional components. The method 250 illustrates the communication between the server(s) 112 and the mobile Internet calling device 102.

Authorized user(s) are allowed to provide the location information for mobile Internet calling devices coupled to the network 110, via step 252. The location information is preferably provided to the server utility 114 and stored in the server utility 114 or the memory 116 to which the server utility 114 has access. The location information is described above and may take many forms. In a preferred embodiment, the location information includes the fixed telephone number corresponding to the server(s) 112 and/or the portions of the network 110 to which the mobile Internet calling device 102 may be connected. The authorized user(s) preferably include network administrator(s).

The mobile Internet calling device 102 is connected to the network 110, via step 254. The mobile Internet calling device 102 then requests the location information from the server(s) 112, via step 256. Typically, this takes the form of a DHCP request for use of the option provided by the server utility 114 in conjunction with a request for an IP configuration. In response to the request, the server(s) 112 (preferably a DHCP server) provide the location information to the mobile Internet calling device 102, via step 258. The location information is preferably provided using the server utility 114. Also in a preferred embodiment, the location information is provided along with the IP configuration for the mobile Internet calling device 102.

In response to an emergency call being initiated using the mobile Internet calling device 102, the mobile Internet calling device 102 traps the call and inserts the location information into the call information, via step 260. Preferably, step 260 includes inserting as an origination identifier for the emergency call, a fixed line telephone number(s) corresponding to the mobile Internet calling device 102. Step 260 may also include inserting the PSAP identifier(s) for the PSAP 130 corresponding to the location of the mobile Internet calling device 102. The location information is relayed over the network 110 to the calling service provider 122, via step 262. In a preferred embodiment, this is accomplished by the network 110 merely forwarding IP packets for the emergency call. Because the location information has been inserted into the call by the mobile Internet calling device 102, forwarding IP packets for the emergency call to the calling service provider 122 automatically forwards the location information to the calling service provider 122.

Using the location information, the emergency call from the mobile Internet computing device is routed through the telephone network 128 and to the appropriate PSAP 130, via step 264. Step 264 is preferably performed by the calling service provider 122. Thus, step 130 routes the emergency call to the PSAP 130 that handles emergency calls for the location corresponding to the location information. The PSAP 130 may then access the appropriate emergency services, such as fire, police, or ambulance, for the user of the mobile Internet calling device 102.

Thus, the mobile Internet calling device 102 is provided with information indicating the physical location at which it currently resides. This information may be used in routing emergency calls. This functionality is provided without requiring additional hardware within the network 110 or mobile Internet calling device 102. In addition, the calling service provider 122 need not own the infrastructure, such as the network 122, in order to route an emergency call to the appropriate PSAP 130. In addition, changes to the database used by the PSAP may be avoided.

A method and system for providing location information for mobile Internet calling devices, particularly for routing of emergency calls, are described. The method and system have been described in accordance with the exemplary embodiments shown, and one of ordinary skill in the art will readily recognize that there could be variations to the embodiments, and any variations would be within the spirit and scope of the method and system. Accordingly, many modifications may be made by one of ordinary skill in the art without departing from the spirit and scope of the appended claims.

We claim:

1. A method comprising:
    receiving client information from a mobile Internet calling device coupled with a network at a location, wherein the client information comprises a request for location information, wherein the request for location information is associated with a request for Internet protocol configuration for the mobile Internet calling device;
    providing to the mobile Internet calling device location information corresponding to the physical location of the mobile Internet calling device, wherein the location information comprises a fixed line identifier for the location, wherein the location information comprises a public safety access point identifier, wherein the location information comprises a public safety access point (PSAP) identifier and a fixed line telephone number;
    inserting the fixed line telephone number as an origination identifier; and
    using the PSAP identifier to route the emergency call to the PSAP corresponding to the location;
    providing the location information to a calling service provider in response to an emergency call made by the mobile Internet calling device when coupled with the network, wherein the providing is automatically performed when IP packets for the emergency call is forwarded to the calling service provider; and
    allowing an authorized user to provide the location information to the network.

2. A tangible computer readable medium comprising a computer readable program when executed on a computer causes the computer to:
    receive client information from a mobile Internet calling device coupled with a network at a location, wherein the client information comprises a request for location information, wherein the request for location information is associated with a request for Internet protocol configuration for the mobile Internet calling device;
    provide to the mobile Internet calling device location information corresponding to the physical location of the mobile Internet calling device, wherein the location information comprises a fixed line identifier for the location, wherein the location information comprises a public safety access point identifier, wherein the location information comprises a public safety access point (PSAP) identifier and a fixed line telephone number;
    insert the fixed line telephone number as an origination identifier; and
    use the PSAP identifier to route the emergency call to the PSAP corresponding to the location;
    provide the location information to a calling service provider in response to an emergency call made by the mobile Internet calling device when coupled with the network, wherein the computer automatically provides the location information to the calling service provider when IP packets for the emergency call is forwarded to the calling service provider; and
    allowing an authorized user to provide the location information to the network.

3. A system comprising:
    a memory for storing the location information;
    at least one server, coupled to the memory, for:
    receiving client information from a mobile Internet calling device coupled with a network at a location, wherein the client information comprises a request for location information, wherein the request for location information is associated with a request for Internet protocol configuration for the mobile Internet calling device;
    providing to the mobile Internet calling device location information corresponding to the physical location of the mobile Internet calling device, wherein the location information comprises a fixed line identifier for the location, wherein the location information comprises a public safety access point identifier, wherein the location information comprises a public safety access point (PSAP) identifier and a fixed line telephone number;
    inserting the fixed line telephone number as an origination identifier; and
    using the PSAP identifier to route the emergency call to the PSAP corresponding to the location;
    providing the location information to a calling service provider in response to an emergency call made by the mobile Internet calling device when coupled with the network, wherein the providing is automatically performed when IP packets for the emergency call is forwarded to the calling service provider; and
    allowing an authorized user to provide the location information to the network.

* * * * *